(No Model.)
J. E. LOWELL.
HEDGE TRIMMER.
No. 424,803. Patented Apr. 1, 1890.
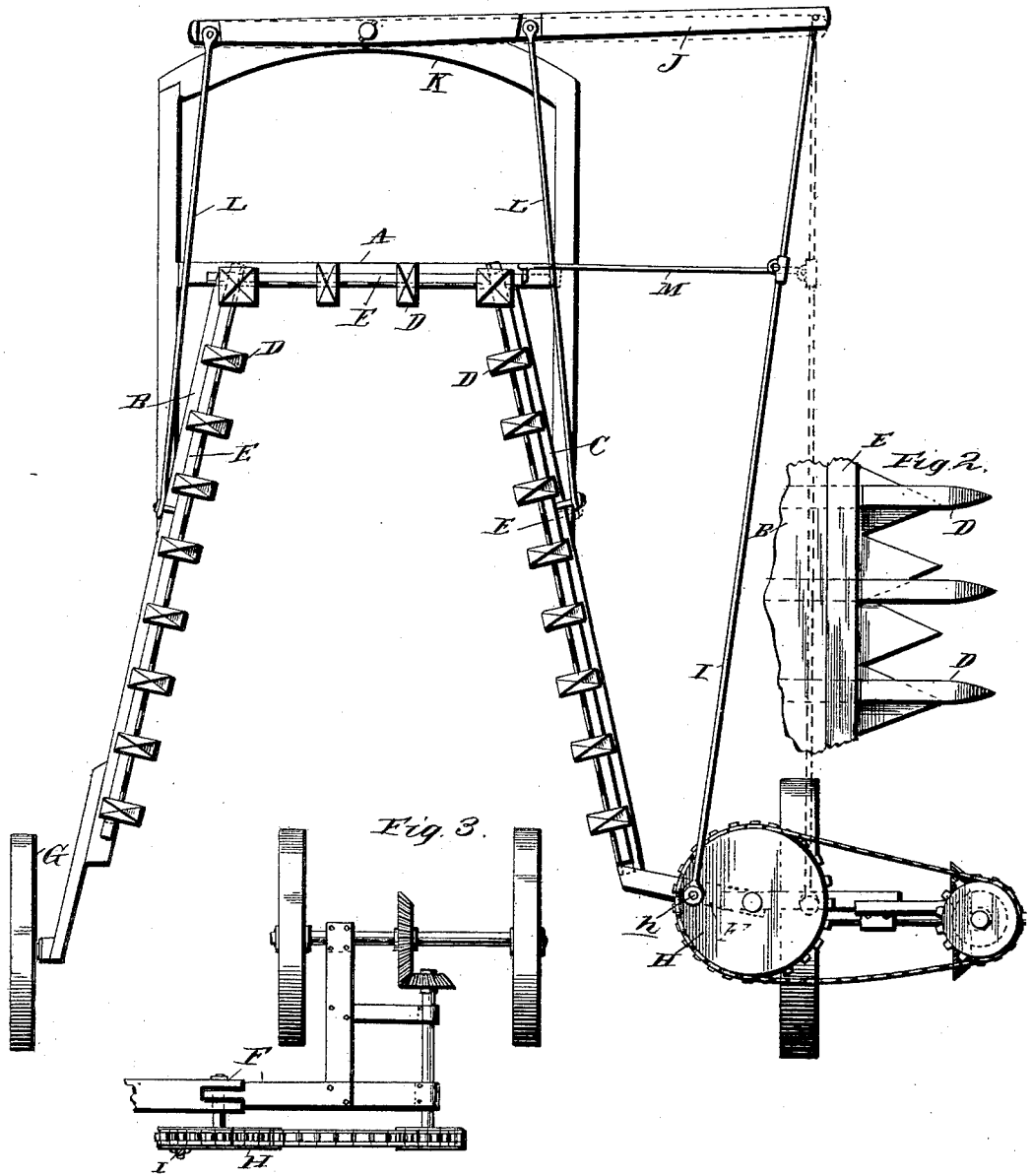
Witnesses:
C. H. Raider
Van Buren Hillyard.
Inventor
James Emet Lowell
By R. S. & H. Gaer
his Attorneys

UNITED STATES PATENT OFFICE.

JAMES EMET LOWELL, OF BOONVILLE, INDIANA, ASSIGNOR OF ONE-HALF TO ELI L. YOUNGBLOOD, OF SAME PLACE.

HEDGE-TRIMMER.

SPECIFICATION forming part of Letters Patent No. 424,803, dated April 1, 1890.

Application filed November 5, 1889. Serial No. 329,265. (No model.)

*To all whom it may concern:*

Be it known that I, JAMES EMET LOWELL, a citizen of the United States, residing at Boonville, in the county of Warrick and State of Indiana, have invented certain new and useful Improvements in Hedge-Trimmers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to hedge-trimmers, and has for its object to provide a trimmer that will operate simultaneously on the top and the two sides of the hedge, and which can be drawn forward by a team on either side of the hedge, according as the trimmer is right or left handed.

The improvement consists of the novel features which will be hereinafter more fully described and claimed, and which are shown in the annexed drawings, in which—

Figure 1 is a front view of the invention, showing the operation of the cutting apparatus by dotted lines. Fig. 2 is a detail view of the cutting mechanism. Fig. 3 is a detail view showing the manner of operating the cutter from the harvesting-machine.

The trimmer is adapted to be attached to any ordinary mowing or harvesting machine, and is operated by the usual driving mechanism. The frame comprises the top bar A and the side bars B and C, and is adapted to straddle the hedge. The side bars B and C spread at the bottom to give a tapering form to the hedge. Suitable cutting apparatus is arranged on the top and side bars of the frame, and is composed of guard-fingers D and reciprocating cutter-bars E, which act in opposition to the cutting-edges of the guard-fingers in the usual manner common to harvester and mower reciprocating cutting apparatus. The inner end or bar C of the frame is hinged to the frame F of any well-known form of harvester or mower, and the outer end or bar B of the frame is supported on the caster-wheel G. By reason of the hinge-connection between the frame of the trimmer and the mower-frame, the trimmer-frame can rise and fall and adapt itself to the contour or inequalities of the ground. The power-driven wheel H is placed in line with the hinge-joint between the two frames, and has a wrist-pin $h$, which is connected by rod I with the walking-beam J, which is pivoted between its ends to yoke or cross-bar K. The cutter-bars on the side bars B and C are connected by pitman L with the walking-beam J equidistant from the pivotal center of the said beam. The cutter-bar on the top bar A is connected by pitman M with the connecting-rod I at a proper distance from the upper end of the said rod I.

The operation of the invention is as follows: The trimmer is set astraddle of the hedge and drawn forward over the same. In the forward motion of the trimmer the cutting apparatus is set in motion and lops off the projecting branches, as will be readily appreciated.

Having fully described my invention, what I claim, and desire to secure by Letters Patent, is—

1. The combination, with the trimmer-frame comprising a top and two side bars, and reciprocating cutting apparatus on the top and side bars of said frame, of a power-driven wheel, a walking-beam connected with the side cutters, a rod connecting the walking-beam with the power-driven wheel, and a pitman connecting said rod with the top cutter-bar, substantially as described.

2. The hereinbefore-described hedge-trimmer, comprising the tops and side bars, the reciprocating cutting apparatus on said bars, the walking-beam pivoted on a yoke which is secured to the trimmer-frame, said walking-beam being connected with the side cutting apparatus, the power-driven wheel, the rod connecting said wheel with the walking-beam, and the pitman connecting the rod with the top cutter, substantially as set forth.

In testimony whereof I affix my signature in presence of two witnesses.

JAMES EMET LOWELL.

Witnesses:
JAMES H. MCCULLA,
EDWARD T. KREBS.